United States Patent
Amemura

(10) Patent No.: US 9,323,516 B2
(45) Date of Patent: Apr. 26, 2016

(54) ELECTRONIC DEVICE SYSTEM AND ELECTRONIC DEVICE

(71) Applicant: Sharp Kabushiki Kaisha, Osaka (JP)

(72) Inventor: Tatsuaki Amemura, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 292 days.

(21) Appl. No.: 13/723,740

(22) Filed: Dec. 21, 2012

(65) Prior Publication Data

US 2013/0166897 A1    Jun. 27, 2013

(30) Foreign Application Priority Data

Dec. 26, 2011 (JP) .................... 2011-283774

(51) Int. Cl.
G06F 9/00      (2006.01)
G06F 15/177    (2006.01)
G06F 9/445     (2006.01)
G06F 9/44      (2006.01)

(52) U.S. Cl.
CPC . *G06F 8/65* (2013.01); *G06F 9/441* (2013.01)

(58) Field of Classification Search
CPC ...................................... G06F 9/441
USPC ........................................ 713/1, 2
See application file for complete search history.

(56) References Cited

U.S. PATENT DOCUMENTS

| 8,777,728 B2* | 7/2014 | Boesen ............... 463/23 |
| 2009/0013165 A1* | 1/2009 | Chow et al. ............ 713/2 |
| 2010/0125388 A1 | 5/2010 | Nagatomo |
| 2013/0054944 A1* | 2/2013 | Darnall et al. .......... 713/2 |

FOREIGN PATENT DOCUMENTS

| JP | 2000-318544 A | 11/2000 |
| JP | 2008-144721 A | 6/2008 |
| JP | 2010-026730 A | 2/2010 |
| JP | 2010-086344 A | 4/2010 |
| JP | 2010-120459 A | 6/2010 |
| JP | 2010-211406 A | 9/2010 |

* cited by examiner

*Primary Examiner* — Mark Connolly
(74) *Attorney, Agent, or Firm* — Keating & Bennett, LLP

(57) ABSTRACT

An electronic device system includes a connection device configured to store a plurality of types of boot data and an electronic device, wherein the electronic device includes a connection unit to which the connection device is connected, a selection unit configured to select boot data to be obtained from the connection device connected to the connection unit, an obtaining unit configured to obtain the boot data selected by the selection unit from the connection device, a storage unit configured to store the boot data obtained by the obtaining unit; and a boot processing unit configured to perform processing in relation to booting of the electronic device by using the boot data stored in the storage unit.

2 Claims, 3 Drawing Sheets

FIG. 2

| WRITE DATA | WRITE-COMPLETION FLAG | PRIORITY LEVEL |
|---|---|---|
| MAC ADDRESS | 0 | 0 0 |
| PLD DATA | 0 | 0 1 |
| SHIPPING DESTINATION DATA | 0 | 1 0 |

ELECTRONIC DEVICE SYSTEM AND ELECTRONIC DEVICE

CROSS-REFERENCE TO RELATED APPLICATIONS

This Nonprovisional application claims priority under 35 U.S.C. §119(a) on Patent Application No. 2011-283774 filed in Japan on Dec. 26, 2011, the entire contents of which are hereby incorporated by reference.

FIELD

The present application relates to an electronic device system and an electronic device capable of rewriting boot data used when booted.

BACKGROUND

Electronic devices such as a personal computer, a digital multifunction printer, and the like include a universal serial bus (USB) interface, through which various external devices may be connected.

As such external devices, for example, a storage device such as a USB memory is used. A method of storing a program for booting an electronic device in a USB memory and booting the electronic device with the boot program stored in the USB memory when power is applied to the electronic device (when the electronic device is booted) has been known (see, for example, Japanese Patent Application Laid-Open No. 2010-211406 and Japanese Patent Application Laid-Open No. 2010-86344).

Also, in the foregoing electronic device, various boot data such as a media access control (MAC) address, programmable logic device (PLD) data, shipping destination data, and the like are frequently written after board mounting.

Conventionally, a storage device such as a USB memory is prepared for each type of the boot data such as each MAC address, each PLD data, or each shipping destination data, and the boot data is read from each storage device and written into a memory of the electronic device.

Thus, conventionally, a writing operation is required to be performed by sequentially changing USB memories that store various the boot data, and efforts and time should be put into the writing of the boot data. Moreover, since a human-induced operation is accompanied, the writing of the boot data required for booting an electronic device may be forgotten, resulting in a failure of booting an electronic device.

SUMMARY

In consideration of the above-mentioned circumstances, it is an object of the present application to provide an electronic device system and an electronic device capable of automatically reading a plurality of types of boot data used for booting from a single external device and writing the same in a memory.

According to an aspect of the present application, an electronic device system includes a connection device configured to store a plurality of types of boot data and an electronic device, wherein the electronic device includes a connection unit to which the connection device is connected, a selection unit configured to select boot data to be obtained from the connection device connected to the connection unit, an obtaining unit configured to obtain the boot data selected by the selection unit from the connection device, a storage unit configured to store the boot data obtained by the obtaining unit, and a boot processing unit configured to perform processing in relation to booting of the electronic device by using the boot data stored in the storage unit.

According to an aspect of the present application, the electronic device includes a table configured to store information regarding a priority level of the boot data to be obtained from the connection device and information indicating whether or not each of the boot data has been obtained, and the obtaining unit is configured to obtain the boot data from the connection device according to the information stored in the table.

According to an aspect of the present application, an electronic device includes a connection unit to which an external device is connected, wherein the external device stores a plurality of types of boot data, a selection unit configured to select boot data to be obtained from the external device connected to the connection unit, an obtaining unit configured to obtain the boot data selected by the selection unit from the external device, a storage unit configured to store the boot data obtained by the obtaining unit, and a boot processing unit configured to perform processing in relation to booting of the electronic device by using the boot data stored in the storage unit.

According to an aspect of the present application, the electronic device includes a table configured to store information regarding a priority level of the boot data to be obtained from the external device and information indicating whether or not each of the boot data has been obtained, wherein the obtaining unit is configured to obtain the boot data from the external device according to the information stored in the table.

In the present application, a plurality of types of the boot data used for booting an electronic device are prepared in an external device (a connection device). The electronic device has a configuration of requesting the connection device for the boot data to be obtained, obtaining the boot data transmitted from the connection device according to the request, and storing the same in a storage unit, whereby the boot data required for booting the electronic device is automatically installed from the single connection device.

In the present application, since the boot data is obtained with reference to a table storing information regarding priority level of the boot data to be obtained and information indicating whether or not each of the boot data is one that has been completely obtained, the data required for booting is sequentially obtained.

According to the present application, since the electronic device is configured to request the connection device for the boot data to be obtained, obtain the boot data transmitted from the connection device according to the request, and store the obtained the boot data in the storage unit, the boot data required for booting an electronic device can be obtained from the single connection device and automatically stored in the storage unit of the electronic device.

The above and further objects and features of the invention will more fully be apparent from the following detailed description with accompanying drawings.

BRIEF DESCRIPTION OF DRAWINGS

FIG. 2 is a schematic view illustrating an example of a device table referred to by an electronic device when power is applied thereto.

DESCRIPTION OF EMBODIMENTS

Hereinafter, an embodiment of the present application will be described in detail with reference to the accompanying drawings that illustrate the embodiment.

Figure 1:
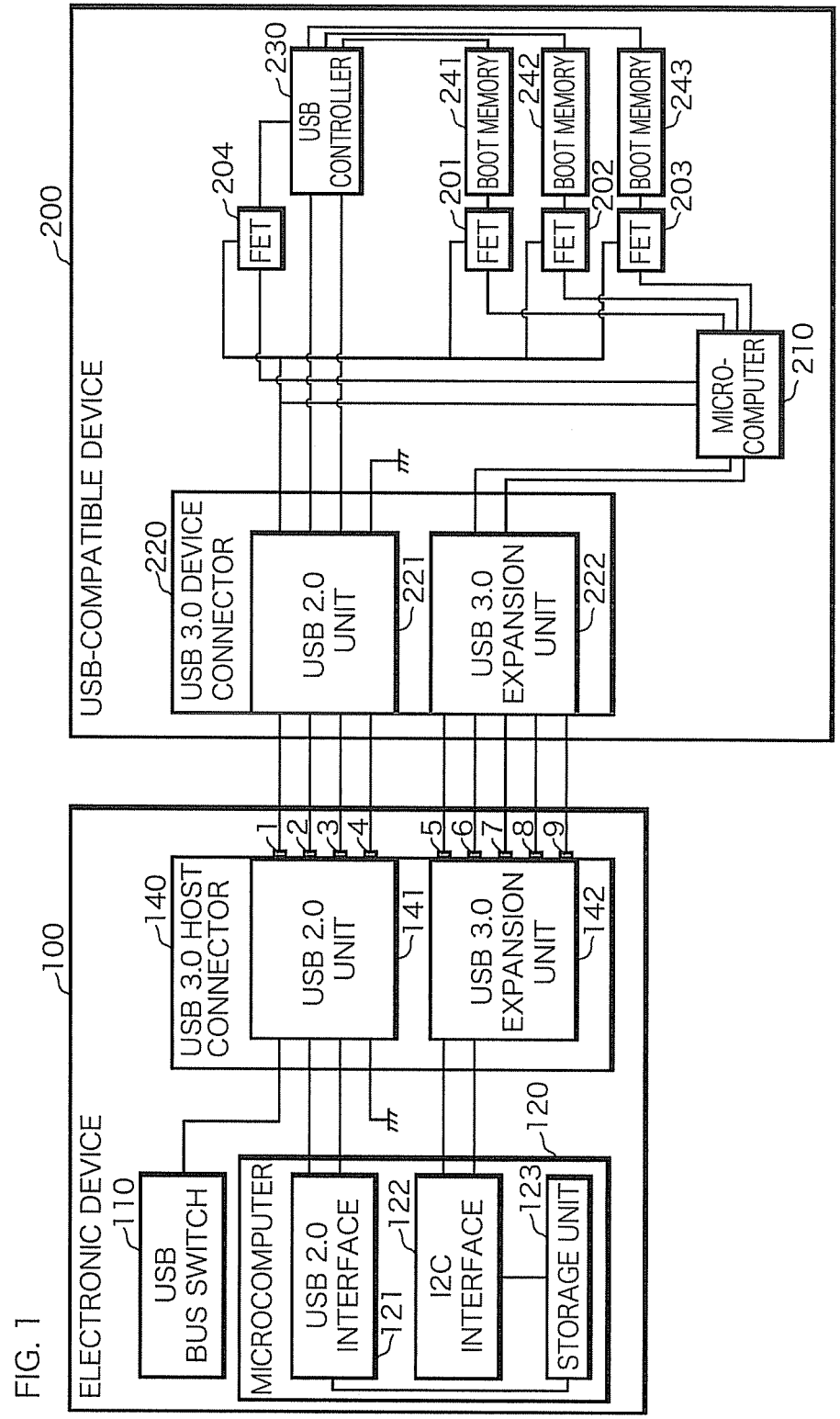
FIG. 1 is a block diagram illustrating an example of an electronic device system according to an embodiment.

FIG. 1 is a block diagram illustrating an example of an electronic device system according to an embodiment. The electronic device system according to the present embodiment includes an electronic device 100 and a USB device connected to the electronic device 100 through a USB connector.

The electronic device 100 is, for example, an information processing device such as a notebook type personal computer or a tablet type mobile terminal, a digital multifunction printer having a copy function, a print function, and a facsimile function or the like.

The USB device (an external device) connected to the electronic device 100 is, for example, a USB-compatible device 200 having compatibility with a device in conformity with a USB 2.0 standard. Here, the USB-compatible device 200 may be a device (a device having compatibility with a device in conformity with the USB 2.0 standard) which is able to transmit data in conformity with the USB 2.0 standard and requires a current exceeding a current standard value (500 mA) determined by the USB 2.0 standard, or a voltage having a voltage standard value (5V) or higher. An example of the USB-compatible device 200 is a storage device such as a memory device, an HDD device or the like.

The electronic device 100 includes a USB bus switch 110, a microcomputer 120, a USB 3.0 host connector 140 and the like. In addition to such a hardware configuration, the electronic device 100 includes various types of hardware to serve as the information processing device and the digital multifunction printer, as described above.

The microcomputer 120 is configured by an integrated circuit that controls the electronic device 100 and includes, for example, a USB 2.0 interface 121, an inter-integrated circuit (I2C) interface 122, and a storage unit 123.

The USB 2.0 interface 121 generates a control signal for controlling an operation of a USB device (the USB-compatible device 200 and a USB 2.0 device (not shown)) connected through the USB 3.0 host connector 140, and transmits the control signal to a USB device of a connection destination through a USB 2.0 unit 141 of the USB 3.0 host connector 140.

The I2C interface 122 is a communication interface for communicating with the USB-compatible device 200 of the connection destination through a USB 3.0 expansion unit 142 of the USB 3.0 host connector 140. Meanwhile, the I2C interface 122 may be any other interface, e.g., a serial peripheral interface (SPI) or the like that may be able to communicate with signal lines of four or less lines.

The storage unit 123 is, for example, a rewritable memory such as an electrically erasable programmable read only memory (EEPROM), a flash ROM or the like, and stores data or the like to be loaded when the electronic device 100 is started (booted). The data to be loaded when the electronic device 100 is booted is, for example, a MAC address, PLD data, shipping destination data determined in each shipping destination or the like.

The USB connector included in the electronic device 100 is the USB 3.0 host connector 140. The USB 3.0 host connector 140 is a USB connector having a connector shape in conformity with a USB 3.0 standard having a first terminal 1 to a ninth terminal 9. The first terminal 1 to a fourth terminal 4 of the USB 3.0 host connector 140 belong to the USB 2.0 unit 141, and a fifth terminal 5 to the ninth terminal 9 belong to the USB 3.0 expansion unit 142.

When the USB-compatible device 200 is connected to the USB 3.0 host connector 140, the first terminal 1 to the ninth terminal 9 are used, and the electronic device 100 transmits data in conformity with the USB 2.0 standard and supplies a current and a voltage (power) exceeding a standard value of the USB 2.0 standard.

Meanwhile, when a USB 2.0 device (not shown) that transmits data in conformity with the USB 2.0 standard and operates within a range of a current standard value (500 mA) determined by the USB 2.0 standard is connected to the USB 3.0 host connector 140, the electronic device 100 transmits data and supplies power in conformity with the USB 2.0 standard by using the first terminal 1 to the fourth terminal 4 of the USB 3.0 host connector 140.

When the USB 2.0 device is connected to the USB 3.0 host connector 140, the first terminal 1 to the fourth terminal 4 are used, and the fifth terminal 5 to ninth terminal 9 are open, indicating that they are free from connection. When the USB 2.0 device is connected, since communication with the I2C interface 122 is not started through the fifth and sixth terminals 5 and 6, the electronic device 100 may determine that the connected device is the USB 2.0 device. Meanwhile, when the USB-compatible device 200 is connected, since communication with the I2C interface 122 is started, the electronic device 100 may determine that the connected device is the USB-compatible device 200.

The USB-compatible device 200 is a device having compatibility with the USB 2.0 standard, and includes a microcomputer 210, a USB 3.0 device connector (a USB connector) 220, a USB controller 230, boot memories 241 to 243, FETs 201 to 204, and the like.

Like the host (the electronic device 100), the USB 3.0 device connector 220 is a USB connector having a connector shape in conformity with the USB 3.0 standard having a first terminal to a ninth terminal. The first terminal to a fourth terminal of the USB 3.0 device connector 220 belong to a USB 2.0 unit 221, and a fifth terminal to the ninth terminal belong to a USB 3.0 expansion unit 222.

The microcomputer 210 is configured by an integrated circuit that controls an operation of the USB-compatible device 200. In the present embodiment, for example, the microcomputer 210 controls to turn on or off the FETs 201 to 204, controls to transmit data read from the boot memories 241 to 243 to the electronic device 100, and the like.

The USB controller 230 receives the control signal from the electronic device 100 through the USB 2.0 unit 221, and reads data stored in the boot memories 241 to 243 according to the received control signal.

The FETs 201 to 204 serve as switches that are turned on or off according to a signal output from the microcomputer 210.

The boot memories 241 to 243 are memories for storing various types of data to be written into the storage unit 123 when the electronic device 100 is booted. In the present embodiment, it is assumed that a MAC address, PLD data, and shipping destination data are stored in the boot memories 241 to 243, respectively.

In the present embodiment, in a case where the USB-compatible device 200 is connected to the electronic device 100 when power is applied to the electronic device 100 (when the electronic device 100 is booted), boot data stored in the boot memories 241 to 243 of the USB-compatible device 200 is selected with reference to a boot device table as described later and written into the storage unit 123 of the electronic device 100.

The USB 3.0 host connector 140 and the USB 3.0 device connector 220 are connected by a cable. Meanwhile, it may be configured such that the USB 3.0 device connector 220 is connected directly to the USB 3.0 host connector 140 without a cable.

In the example of FIG. 1, the microcomputer 120 is implemented as a component having a USB host controller, but without being limited thereto, the present application may be applicable even to a case in which a component having a USB host controller is installed in a system on a chip (SOC) or a south bridge chip set, or the like.

FIG. 2 is a schematic view illustrating an example of a device table referred to by the electronic device 100 when power is applied thereto. The boot device table is a table that stores write data, a write completion flag, and a priority level in association with each other, and stored in an internal memory of the microcomputer 120 or a memory connected to the exterior of the microcomputer 120.

The write data indicates the type of boot data, and as mentioned above, it indicates the type such as a MAC address, PLD data, shipping destination data determined for each shipping destination, and the like.

The write-completion flag is a flag indicating whether or not data in the storage unit 123 is write-completed data. When the data in the storage unit 123 is not write-completed data, the flag is set to "0," and when the data in the storage unit 123 is write-completed data, the flat is set to "1." The setting of the write-completion flag is executed by the microcomputer 120.

Priority level is information indicating an order in which the boot data is written in the storage unit 123. As priority level is higher, a smaller value is assigned.

In the example illustrated in FIG. 2, priority levels of the MAC address, the PLD data, and the shipping destination data are "00," "01," and "10," respectively, and no data is write-completed. Therefore, the microcomputer 120 controls to obtain the boot data from the USB-compatible device 200 in the order of the MAC address, the PLD data, and the shipping destination data according to the priority levels, and write the obtained boot data to the storage unit 123. After writing the boot data in the storage unit 123, the microcomputer 120 changes the write-completion flag of the boot data into "1," thereby updating the boot device table.

Figure 3:
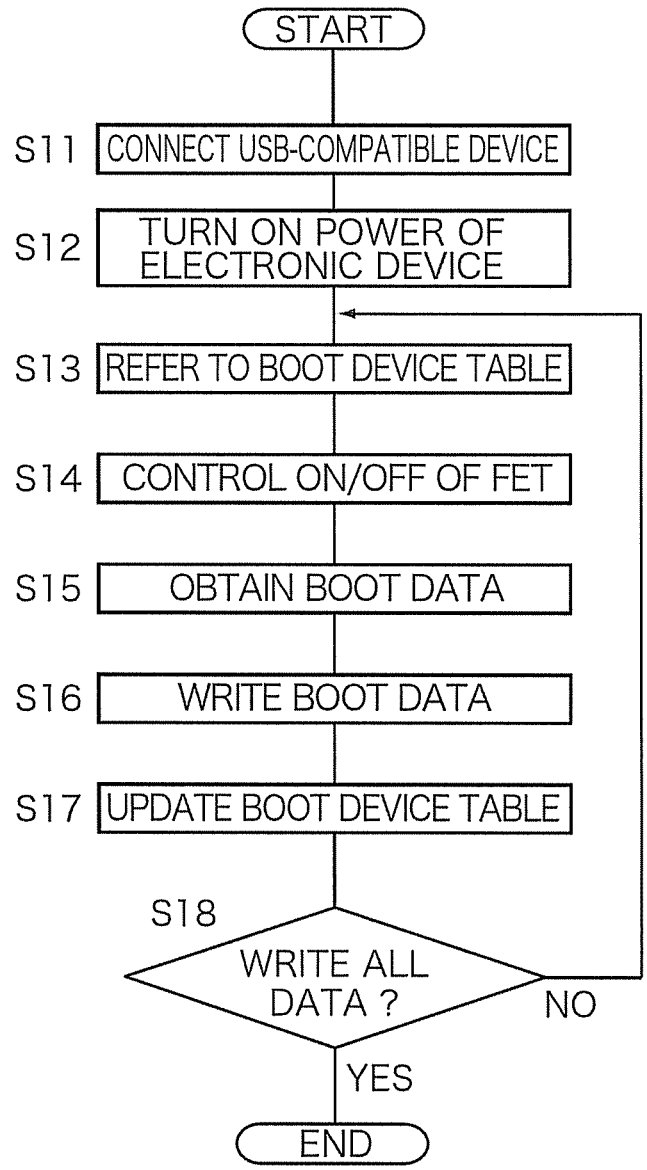
FIG. 3 is a flowchart for illustrating an operation of the electronic device system when power is applied thereto according to the embodiment of the present invention.

FIG. 3 is a flowchart for illustrating an operation of an electronic device system when power is applied thereto according to the present embodiment. When the USB-compatible device 200 is connected to the electronic device 100 (step S11) and power is applied to the electronic device 100 (step S12), the microcomputer 120 of the electronic device 100 refers to the boot device table (step S13) and controls ON/OFF operation of the FETs 201 to 203 within the USB-compatible device 200 in order to obtain required the boot data (step S14).

For example, when the boot device table illustrated in FIG. 2 is referred to, the write flag for each boot data is "0" and the MAC address has the highest priority level. Thus, in order to obtain the MAC address, the electronic device 100 controls the USB-compatible device 200. Specifically, the microcomputer 120 of the electronic device 100 outputs a signal (a transmission request signal) for requesting a MAC address to the USB-compatible device 200 through the I2C interface 122 and the USB 3.0 expansion unit 142.

The transmission request signal output through the I2C interface 122 of the electronic device 100 is input to the microcomputer 210 through the USB 3.0 device connector 220 of the USB-compatible device 200.

Since the microcomputer 210 reads data from the boot memory 241 (242, 243) that stores the boot data to be read based on the input transmission request signal, the microcomputer 210 controls the FET 201 (202, 203) connected to the boot memory 241 (242, 243) to be turned on. Also, the microcomputer 210 turns on the FET 204 and outputs a control signal for instructing data reading to the USB controller 230. Meanwhile, it is assumed that the microcomputer 210 has a table in which identifiers of the boot data stored in the respective boot memories 241 to 243 and identifiers for identifying the FETs 201 to 203 are associated with one another, and executes ON/OFF control on the FETs 201 to 203 with reference to the table.

According to the control signal from the microcomputer 210, the USB controller 230 instructs to read data from the boot memories 241 to 243. The data read from the boot memories 241 to 243 is input to the microcomputer 210 only when any one of the FETs 201 to 203 is turned on.

The microcomputer 210 transmits the boot data obtained from one of the boot memories 241 to 243 to the electronic device 100 through the USB 3.0 expansion unit 222.

The microcomputer 120 of the electronic device 100 obtains the boot data transmitted from the USB-compatible device 200 through the USB 3.0 expansion unit 142 (step S15). The microcomputer 120 writes the obtained the boot data into the storage unit 123 through the I2C interface 122 (step S16).

After writing the boot data into the storage unit 123, the microcomputer 120 updates the boot device table (step S17). In this case, the microcomputer 120 updates the boot device table by changing the write-completion flag for the written boot data from "0" to "1."

Thereafter, the microcomputer 120 determines whether or not all the data has been completely written with reference to the write-completion flag of the boot device table (step S18). When all the data has not been completely written (NO in step S18), the microcomputer 120 returns the process to step S13, and when all the data has been completely written (YES in step S18), the microcomputer 120 terminates the process based on the present flowchart.

After writing the boot data in step S16, the microcomputer 120 performs a boot process to boot the electronic device 100. In the present embodiment, it is configured such that boot data is sequentially obtained from the highest priority level. Therefore, it may be configured such that boot data is sequentially obtained while executing the boot process or it may be configured such that the boot process may be performed at a timing when obtaining of all the boot data is completed.

As described above, in the present embodiment, when the electronic device is booted, the boot data to be obtained is automatically selected and written into the storage unit of the electronic device, whereby a temporal loss due to re-obtaining of write-completed boot data can be prevented. Furthermore, as writing of required the boot data cannot be forgotten, a generation of a defect in booting the electronic device can be restrained.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electronic device system comprising:
a connection device configured to store a plurality of types of boot data; and
an electronic device, wherein the electronic device comprises:
- a connection unit to which the connection device is connected;
- a selection unit configured to select boot data to be obtained from the connection device connected to the connection unit;
- a storage unit configured to store the boot data obtained by the obtaining unit;
- a boot processing unit configured to perform processing in relation to booting of the electronic device by using the boot data stored in the storage unit; and
- a table configured to store information regarding a priority level of the boot data to be obtained from the connection device and information indicating whether or not each of the boot data has been obtained, wherein
- the obtaining unit is configured to obtain the boot data selected by the selection unit from the connection device according to the information stored in the table.

2. An electronic device comprising:
- a connection unit to which an external device is connected, wherein the external device stores a plurality of types of boot data;
- a selection unit configured to select boot data to be obtained from the external device connected to the connection unit;
- a storage unit configured to store the boot data obtained by the obtaining unit;
- a boot processing unit configured to perform processing in relation to booting of the electronic device by using the boot data stored in the storage unit; and
- a table configured to store information regarding a priority level of the boot data to be obtained from the external device and information indicating whether or not each of the boot data has been obtained, wherein
- the obtaining unit is configured to obtain the boot data selected by the selection unit from the external device according to the information stored in the table.

* * * * *